US008825831B2

(12) United States Patent
Horn et al.

(10) Patent No.: US 8,825,831 B2
(45) Date of Patent: Sep. 2, 2014

(54) METHOD FOR OBTAINING INFORMATION ABOUT A TRANSMISSION CAPABILITY

(75) Inventors: Uwe Horn, Aachen (DE); Stefan Wager, Esbo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 2426 days.

(21) Appl. No.: 10/549,532

(22) PCT Filed: Mar. 17, 2003

(86) PCT No.: PCT/EP03/02766
§ 371 (c)(1),
(2), (4) Date: Sep. 15, 2005

(87) PCT Pub. No.: WO2004/084474
PCT Pub. Date: Sep. 30, 2004

(65) Prior Publication Data
US 2006/0174023 A1     Aug. 3, 2006

(51) Int. Cl.
*G06F 15/173* (2006.01)
*G06F 15/16* (2006.01)
(52) U.S. Cl.
USPC .......................................... 709/224; 709/232
(58) Field of Classification Search
USPC .......................................................... 709/224
See application file for complete search history.

(56) References Cited

U.S. PATENT DOCUMENTS 6,292,834 B1    9/2001  Ravi et al.
6,473,597 B1 *  10/2002  Johnson ........................ 455/63.1
6,701,372 B2 *  3/2004  Yano et al. ..................... 709/232
2002/0068588 A1    6/2002  Aoe et al.
2003/0023746 A1    1/2003  Loguinov
2004/0252701 A1 *  12/2004  Anandakumar et al. . 370/395.21

FOREIGN PATENT DOCUMENTS

JP        2002-204278 A        7/2002

OTHER PUBLICATIONS

"End-to-End Available Bandwidth: Measurement Methodology, Dynamics, and Relation with TCP Throughput" Manish Jain, Constantinos Dovrolis. Proceedings of the 2002 SIGCOMM conference, vol. 32 , Issue 4 (Oct. 2002), pp. 295-308.*
"Controlling a Sending Rate for Transmission of Real-time Traffic through a Low-birate Internet Connection." K. Yano, el al., The Institute of Electronics, Information and Communication Engineers. Technical Report, vol. 97, No. 294; Sep. 30, 1997 Note: Document is in Japanese. only abstract is in English.

* cited by examiner

*Primary Examiner* — Noel Beharry

(57) ABSTRACT

A method for obtaining information about a transmission capability of a transmission link (TL) is disclosed. A sending entity (SE) sends data packets at a sending rate to the transmission link (TL), which transmits the data packets according to its transmission capability to a receiving entity (RE) receiving the data packets at a receiving rate. The sending rate is modulated with a rate modulation and the following steps are executed by an analysis entity (AE): obtaining the sending rate, obtaining the receiving rate, comparing the obtained sending rate and the obtained receiving rate to determine a relation of the obtained sending rate and the obtained receiving rate and to determine an appearance of the rate modulation of the sending rate in the obtained receiving rate, and obtaining the information about the transmission capability based on the determined relation and the determined appearance of the rate modulation.

38 Claims, 7 Drawing Sheets

METHOD FOR OBTAINING INFORMATION ABOUT A TRANSMISSION CAPABILITY

TECHNICAL FIELD OF THE INVENTION

The present invention relates to communication networks and especially to a method for obtaining information about a transmission capability of a transmission link. The invention also concerns an analysis entity and a computer program.

BACKGROUND OF THE INVENTION

In communication networks data can be sent via transmission links from sending entities to receiving entities and for many situations it is required or at least advantageous that the sending rate of the sent data and the transmission capability of the transmission link match.

FIG. 1 is used to explain an implementation for matching the transmission capability and the sending rate for a streaming application in a mobile communication system like the UMTS system. For streaming applications, a streaming server acting as sending entity sends a stream of data packets via a transmission link (TL) to the user equipment (UE) and finally to the streaming client acting as receiving entity in this example. The transmission link (TL) comprises a link from the streaming server via a backbone network to a core network of a mobile communication network. The transmission link (TL) is further extended from the core network to the radio network which is illustrated by the RNC and to the UE. Streamed data received at the UE is passed to the streaming client, where it can be further processed, e.g. for a multimedia presentation on the UE. A part of the transmission link (TL) is build by a streaming bearer (SB), which is, according to this example, realized by a transmission link between the core network and the UE comprising a UMTS wireless link. Streaming bearers can have transmission rates of different discrete values, e.g. 32 kbps or 64 kbps. A bearer can change its transmission rate, e.g. during a streaming session. Changing the transmission rate comprises switching from a first discrete rate value to a second discrete rate value. For a bearer changing its transmission rate, sometimes the term "elastic bearer" is used.

The streaming server contains a scheduler and a content storage comprising the content to be sent to the streaming client. The scheduler determines the sending rate at which the streaming data leaves the streaming server. The data in the content storage can be stored at different data formats and different data rates for matching the receiving capabilities of the streaming client and transmission capabilities of the transmission link interconnecting the streaming client and the streaming server. The data rates in the content storage and the sending rate can differ, however, for the reason of simplicity no differentiation is made between both rates in the following. Note that the streaming server does not necessarily have to be located outside the core network as indicated in FIG. 1. Instead, the streaming server can be located within the core network.

For starting the streaming of data, the streaming client requests (1), e.g. by using the Real-Time Streaming Protocol (RTSP), content from the streaming server, e.g. over an already existing connection which can be a best effort UMTS bearer. In response to this request (1), the streaming server provides (2) the streaming client with information at which rates the content can be streamed. The streaming client utilizes this information to request (3) at an entity of the core network of the mobile communication system a streaming bearer which is suited to operate on at least one of the available rates. The information on the rates at which the content can be streamed is transferred (4) to a radio resource management in a RNC that can make a reservation for appropriate radio resources depending on the received information such that the content can be streamed at one of the transmission rates supported by the streaming bearer. In a next step, a streaming bearer is established (5) between the core network and the user equipment for entering data into the streaming client. After the streaming bearer is established, the streaming server starts to send (6) the streaming content over the streaming bearer at one of the data rates matching to the receiving capabilities of the client.

The above example serves to illustrate a way for the sending entity to match its content and sending rate to the available receiver capability and for the interconnecting network to assign a transmission link that fits to the available receiving capability and to a sending rate which is a workable solution for the case that the interconnecting network can fulfill the requirements of meeting the sending rate. However, for the case that the interconnecting network chooses for any reasons a transmission link having a transmission capability not fitting to the sending rate of the sending entity or the transmission capability changes, applying existing mechanisms for obtaining information about the transmission capability of the transmission link as a base for a possible a matching decision have several shortcomings and drawbacks:

According to a first solution, it is possible to adapt an RNC serving an elastic bearer to signal the current bearer rate directly to a streaming server acting as sending entity. This kind of "network-feedback" solution, i.e. the signaling of the transmission rate of a transmission link from a network controller like an RNC or a BSC to a sending entity like the streaming server, requires changes in protocols on several standardized interfaces. Therefore, network-feedback solutions are generally regarded as very problematic to implement in a communication network being subject of standardization, e.g. mobile communication networks being compliant to the 3GPP standard.

According to a second solution, information about dropped data packets can be signaled via reports, e.g. according to the RTCP protocol, from the streaming client to the streaming server. Packet drops occur if the storage capacity, i.e. the buffer size, of the buffer before the bearer is exceeded. The reason is that the sending rate exceeds the bearer rate leading to an inflow of data packets into the buffer being higher than the outflow of data packets. If the buffer size is exceeded, packets are dropped at buffer overflow. About this stage, considering the time delay introduced by the transmission link and processing delays in the UE and the streaming client, the streaming client can detect the packet drops and can start to send RTCP reports comprising information about packet drops to the streaming server. Based on that, the streaming server is informed about Little buffer overflow and can deduct that the transmission rate is below the present sending rate. Further information about the transmission capability cannot be obtained by such packet drop solutions. However, packet drops should be generally avoided, e.g. because retransmissions of dropped packets may become necessary and the play out of streamed data at the streaming client may be interrupted. Packet drops are especially problematic for many real-time applications. Therefore, the solutions based on packet drops are generally regarded as too slow, because the sending entity can be informed earliest at a stage where packet losses already have occurred.

In summary, existing solutions for obtaining information about a transmission capability of a transmission link are difficult to implement, are slow, or provide insufficient information.

SUMMARY OF THE INVENTION

It is an object of the present invention to provide a method, a device and a computer program, which overcome the aforementioned problems and achieve an easier to implement and an earlier obtaining of extended information about a transmission capability of a transmission link.

The present invention discloses a method for obtaining information about a transmission capability of a transmission link. A sending entity sends data packets at a sending rate to the transmission link. The transmission link transmits the data packets according to its transmission capability to a receiving entity receiving the data packets at a receiving rate. A requirement for the present invention is that the sending rate is modulated with a rate modulation, e.g. the data packet are sent at a first rate (e.g. a constant rate) having not the rate modulation and a second rate that has the rate modulation.

An analysis entity is utilized for the demanded obtaining of the information about the transmission capability of the transmission link. The analysis entity obtains the sending rate, e.g. based on sending rate related information representing to the analysis entity information related to the sending rate from which the analysis entity can obtain, e.g. calculate. the sending rate or by explicit signaling of the sending rate to the analysis entity. The obtained sending rate can be identical to the sending rate, however, in a real system with delays and jitter, the obtained sending rate may deviate to a certain extend from the sending rate. In any case, the obtained sending rate is such that the analysis entity can conclude to the sending rate with the rate modulation at which the data packets are sent from the sending entity to the transmission link.

The analysis entity obtains also the receiving rate, e.g. based on receiving rate related information representing to the analysis entity information related to the receiving rate from which the analysis entity can calculate the obtained receiving rate representing to the analysis entity the receiving rate or by explicit signaling of the receiving rate to the analysis entity. Similarly, the obtained receiving rate can be identical to the receiving rate or may deviate from the receiving rate. In any case, the obtained receiving rate is such that the analysis entity can conclude to the receiving rate at which the data packets are received at the receiving entity.

For the purpose of obtaining the information about the transmission capability of the transmission link, the analysis entity compares the obtained sending rate and the obtained receiving rate. For the comparison step, at least one of the obtained sending rate and the obtained receiving rate may be further processed. The comparison provides information to the analysis entity about the transmission capability of the transmission link, because the receiving rate and thus the obtained receiving rate depend on the relation of the transmission capability and the sending rate and thus the obtained sending rate. From the knowledge of the sending rate (by the obtained sending rate) and the receiving rate (by the obtained receiving rate), the analysis entity can conclude to the transmission capability of the transmission link. In the comparison, a relation of the obtained sending rate and the obtained receiving rate is determined. The determination of the relation reveals to the analysis first information about the transmission capability, e.g. if the transmission capability is equal to or exceeded by the sending rate. Extended information about the transmission capability is obtained by determining an appearance of a rate modulation corresponding to the rate modulation of the sending rate in the obtained receiving rate. Determining the appearance includes that no rate modulation according to the rate modulation of the sending entity is detected by the analysis entity. The reason for the determination step is that depending on the relation of the sending rate to the transmission capability, the rate modulation of the sending rate is at least partly visible in the receiving rate and thus in the obtained receiving rate or not, e.g. it provides the analysis entity with information to differentiate the case that the transmission rate of the transmission link is equal or above the sending rate.

The determined relation of the sending rate and the receiving rate and the determined appearance of the rate modulation in the receiving rate therefore provides the analysis entity with sufficient information to obtain the transmission capability of the transmission link. Accordingly, in the last step, the analysis entity obtains the information about the transmission capability of the transmission link based on the relation of the sending rate and the receiving rate and the appearance of the rate modulation.

The method achieves the object of obtaining of extended information about the transmission capability of a transmission link in an easy way at an early stage. The method is based on the obtaining and processing of the sending rate and the receiving rate and does not rely on the detection of data packet drops. Therefore. the obtaining of the information about the transmission capability of the transmission link can be achieved at a much earlier stage compared to packet-drop-solutions. Furthermore, the proposed method gains the information about the transmission capability from the relation of the sending rate and the receiving rate and by a determination of the appearance of the rate modulation of the sending rate in the receiving rate which allows the analysis entity to obtain extended information about the transmission not restricted to statements like buffer overflow detected and transmission rate below the sending rate as it is provided in solutions based on packet drops. The present invention does not require the signaling of a transmission rate as in network-feedback solutions. Instead, as stated already before, the present method relies on the obtaining of the sending rate and the receiving rate which can be achieved easily in multiple ways especially in systems that underlay standardization. In addition, the present method does not explicitly stipulate a certain way for the obtaining of the sending and receiving rate such that one could select most suited ways for obtaining the respective rates, depending on different situations or systems, which enhances the flexibility of the proposed method and supports further the implementation.

According to another preferred embodiment, the information about the transmission capability is at least one of information about a transmission rate of the transmission link, information about a relationship of the transmission rate versus the sending rate, and information about a status of a buffer of the transmission link.

According to another preferred embodiment. the obtained receiving rate is separated into a fraction having the rate modulation and a fraction having not the rate modulation. The obtained receiving rate is separated into a fraction having the rate modulation and a fraction having not the rate modulation. Furthermore, the fraction of the sending rate having not the rate modulation is compared to the fraction of the receiving rate having not the rate modulation to determine the relation and the fraction of the receiving rate having the rate modulation is analyzed for the determining of the appearance of the rate modulation. The separation of a rate into a fraction having the rate modulation and a fraction having not the modulation rate can be e.g. achieved by filtering.

According to another preferred embodiment, the obtained sending rate and the obtained receiving rate are subtracted and the subtracted signal is analyzed to determine the relation and the appearance of the rate modulation.

According to another preferred embodiment, the data packets are sent from the sending entity to the receiving entity end-to-end on a first layer. In layered communication, the transmission capability of the transmission link can be defined by a second layer being a non end-to-end layer below the first layer. At least one of the sending rate and the receiving rate can be obtained based on information from the first layer or one or more end-to-end layers above the first layer. Obtaining the sending rate and/or receiving rate based on information from a non-end-to-end layer would require exchange of information between end-to-end layers and non end-to-end layers which is typically difficult to achieve. Therefore, obtaining the respective rates based on information from one or more of the end-to-end layers eases the implementation of the method. For a streaming application, as an example for a layered communication, the data packets can be streamed on the session layer end-to-end from the sending entity via the transmission link to the receiving entity. The transmission rate of the transmission link can be defined by a non-end-to-end link layer. Obtaining the sending and/or receiving rate based on information from the link layer is then difficult to achieve especially in communication systems that are subject for standardization. Therefore, the sending rate and/or the receiving rate are preferably obtained based on information from an end-to-end layer like the session layer, the presentation layer, or the application layer.

According to another preferred embodiment, the sending rate and the receiving rate are obtained and compared on the base of sequence numbers associated to the data packets. A feature of the sequence numbers is that the sequence numbers are ordered according to a sequence. Associating sequence numbers to data packets is a common procedure in many communication systems and the sequence numbers can be associated to respective information on base of that the analysis entity can obtain the sending rate and the receiving rate on the base of the sequence numbers. Comparing the obtained sending rate and the obtained receiving rate on the base of the sequence numbers has the advantage that the sending rate and receiving rate can be compared for the same data packets having the same sequence numbers, which generally enhances the accuracy of the proposed method as time offsets between sending rate and the receiving rate can be de-calibrated. Thus, a "phase-match" of the obtained sending rate and the obtained receiving rate can be achieved by referring the obtained sending rate and the obtained receiving rate to the same sequence number base. The information about the transmission capability can be thus also obtained based on the sequence numbers. Alternatively or in addition, the obtained sending rate and the obtained receiving rate can be obtained and compared over time. The obtaining over time achieves that the temporal evolution of the obtained sending rate and the obtained receiving rate can be compared, e.g. based on time curves. In addition, the temporal evolution of the transmission capability can be obtained. Time-delays introduced by the transmission link between the obtained sending rate and the obtained receiving rate can be detected and removed by combining time and sequence number based comparing. Furthermore, the obtaining and comparing based on sequence numbers and/or over time supports the determination of the appearance of the rate modulation.

At least one of the sending rate and the receiving rate can be communicated to the analysis entity. Based on the communicated sending rate and the communicated receiving rate, the analysis entity can obtain the sending rate and the receiving rate, respectively, used in the comparison step.

According to another preferred embodiments the analysis entity obtains receiving rate related information on the base of sequence numbers which can be achieved by receiving receiver reports from the receiving entity. Each receiver report is received at a receiving time at the analysis entity which determines for each receiver report the respective receiving time and a respective included respective sequence number. A clock or a timer may be used for the determination of the respective receiving times. An included sequence number indicates the most progressed of the sequence numbers available at the time of the generation of the receiver report at receiving entity. For two subsequent receiver reports, the most progressed sequence number of a previous receiver report can be previous or equal to the most progressed sequence number of a subsequent receiver report. Based on the receiving rate related information, the analysis entity can obtain, e.g. calculate, the receiving rate. This embodiment is very preferable because the indication of the most progressed sequence numbers by receiver reports is common in many communication protocols. Furthermore, due to the determination of the receiving time, no time stamps and/or explicit indication of the receiving rate have to be sent from the receiving entity to the analysis entity which restricts the number of possible communication protocols between the receiving entity and the analysis entity to be used. Furthermore, the processing effort for determining and sending such additional information at the receiving entity is not required and thus lowered. The same applies for the load of the transmission link to be used for sending of information from the receiving entity to the analysis entity. Else, if the receiving entity and the communication protocol perform the inclusion of time stamps and/or explicit receiving rate related information, an extraction step of the included additional information at the analysis entity for the purpose of the obtaining of the respective rate information is then not necessarily required. Furthermore, the comparing on the base of sequence numbers can be achieved on the base of the included sequence numbers, because the included sequence numbers are a subset of the sequence numbers associated to the data packets. For example, the analysis entity may obtain the sending rate on the base of the sequence numbers associated to the sent data packets and the receiving rate on the base of the included sequence numbers. For the comparison on the base of the included sequence numbers, the analysis entity can search the obtained sending rate on the base of the sequence numbers for entries for the included, sequence numbers and can retrieve the found entries revealing the obtained sending rate on the base of included sequence numbers to be entered into the comparison with the obtained receiving rate on the base of the included sequence numbers.

According to another preferred embodiment, the receiver reports are generated and sent from the receiving entity according to a rule and the rate modulation of the sending rate is adjusted to the rule. Adjusting the rate modulation is advantageous, because for many receiving entities the interval for generating and sending of the receiver reports as an example for a rule cannot be adjusted externally, e.g. by the sending entity. Furthermore, the interval according receiver reports are generated and sent from the receiving entity set the minimum sampling interval for obtaining the receiving rate. According to sampling theorem, the minimum sampling interval must be at least half the rate modulation period. A higher sampling interval to rate modulation period ratio is advantageous for a better resolving of the evolution of obtained receiving rate.

According to another preferred embodiment, the data packets comply with the Real Time protocol Control part Protocol (RTCP). RTCP is a very common protocol and the usage of RTCP eases the implementation of the invention.

According to another preferred embodiment, the data packets comply with the Real Time Protocol (RTP). RTP is also a very common protocol and the usage of RTP eases the implementation of the invention.

Especially for streaming applications in which data packets can be streamed from a streaming server to a receiving entity for e.g. presenting the streamed data in a multimedia presentation, RTP for the data packets and RTCP for the receiver reports protocols are already utilized. Therefore, using RTP and RTCP can ease the implementation for streaming application.

According to another preferred embodiment, the sending rate can be adjusted to at least one of pre-known information about one or more possible transmission capabilities of the transmission link and the obtained information about the transmission capability. Adjusting the sending rate means adjusting either the modulated fraction of the sending rate, i.e. the fraction of the sending rate having solely the rate modulation, or the unmodulated fraction of the sending rate, i.e. the fraction of the sending entity not having the rate modulation, or both fractions. Adjusting may be achieved continuously or event-triggered, smoothly or stepwise. Adjusting may be achieved by switching from a first sending rate to a second sending rate for the unmodulated fraction or the modulated fraction of the sending rate or for both fractions. Adjusting the sending rate to pre-known information about one or more possible transmission capabilities of the transmission link can provide that the sending rate is better matched to the transmission capability, e.g. in situations where no or insufficient information about the transmission capability according that the data packets are transmitted via the transmission link is available. Thus, adjusting the sending rate to pre-known information about one or more possible transmission capabilities of the transmission link can achieve to reduce a possible mismatch between the sending rate and the transmission capability. Adjusting the sending rate to the obtained transmission rate is very advantageous because it can ensure that the sending rate is always best matched to the obtained transmission capability. In many situations and systems where it is demanded that the unmodulated fraction of the sending rate best matches to the current transmission rate, it can advantageous if the rate modulation does not introduce in average any rate offsets to the unmodulated fraction of the sending rate. For the rate modulation this means that the amount of data sent in a first period of time where the sending rate exceeds the unmodulated sending rate due to the additional positive contribution by the rate modulation must be equal to the amount of data sent in a second period of time where the sending rate is less the unmodulated sending rate due to the negative contribution by the rate modulation. The first period may be identical or different from the second period. The amplitude and the first period of the rate modulation should be adjusted in a way such that packet losses are avoided due to an excess of the transmission capability of the transmission link during the first period. Utilizing both, the pre-known information and the obtained information, is desirable, because the sending rate can be adjusted exacter and faster to the transmission capability of the transmission link. Obtained information about the transmission capability can become pre-known information to be considered by the analysis entity in the future.

According to another preferred embodiment, the transmission capability is adjusted based on the obtained information about the transmission capability. The adjustment of the transmission capability may be executed alternatively or in addition to the adjustment of the sending rate. Similarly, the adjusting of the transmission capability may be achieved continuously or event-triggered, smoothly or stepwise. Adjusting may be achieved by switching from a first transmission capability to a second transmission capability. For adjusting the transmission capability based on the information obtained by the analysis entity, an appropriate instruction based on the obtained information about the transmission link can be communicated to an entity controlling the transmission capability of the transmission link. Alternatively or in addition, the analysis entity may communicate the obtained sending rate or the obtained sending rate versus the obtained transmission capability to the entity controlling the transmission link for making its own decision for the adjustment of the transmission capability.

Thus, the obtained information about the transmission capability may be used by the analysis entity for a decision to adjust the sending rate and/or the transmission capability and to communicate an instruction to the sending entity and/or an entity controlling the transmission capability to adjust the sending rate and/or the transmission capability, respectively, appropriately. Alternatively or in addition, the analysis entity can forward the obtained information to the sending entity and/or the controlling entity, respectively for decision on and execution of an appropriate adjustment.

According to another preferred embodiment, the sending entity receives the data packets at one or more further sending rates from a further sending entity and, based on the obtained information about the transmission capability, the sending entity is instructed to send the data packets to the transmission link at a new sending rate according to one of the one or more further sending rates. An advantage is that the sending at a new sending rate is faster to achieve if the data packets are already available at the sending entity according to the new sending rate.

According to another preferred embodiment, the one or more further sending rates are not modulated with the rate modulation and the sending entity effects the rate modulation of the new sending rate. Usually sending rates are unmodulated. Therefore. interposing a sending entity effecting the rate modulation between the further sending entity and the transmission link eases the implementation as no rate modulation functionality has to be necessarily implemented in the further entity. Furthermore, modulating the new sending rate enables the analysis entity to continuatively apply the method for the obtaining of the transmission capability according to the present invention on the base of the new sending rate. The rate modulation on the new sending rate does not necessarily have to be identical to the rate modulation on the sending rate that has been previously used, e.g. when changing to the new sending rate or later in the procedure, the rate modulation on the new sending rate may be adjusted according to the obtained information about the transmission capability and/or pre-known transmission capabilities.

According to another preferred embodiment, the analysis entity and the sending entity are located, on a streaming server. Alternatively, the analysis entity and the sending entity can be located on a proxy server and the further sending entity can be a streaming server sending data packets to the proxy server. Furthermore, the analysis entity can be located at the receiving entity.

It is preferred to apply the method to a wireless communication system in order to obtain information about the transmission capability of the transmission link being or comprising a wireless link. In a wireless communication network, wherein the transmission link between a sending entity and a receiving entity is or comprises a wireless link, the wireless link very often is the entity which limits the data flow from the sending entity to the receiving entity. The reason for that is that typically wired connections provide significantly much more bandwidth than wireless links such that data can pass a wired connection at a much higher rate than a wireless link, often also called a "bottleneck link". In addition, the transmission capability of a wireless link can change, e.g. by utilizing an elastic bearer. Therefore, it is very useful to apply the method especially to wireless links.

The present invention also concerns a device in order to implement the method as described above. An analysis entity is disclosed for the obtaining of a transmission capability of a transmission link in a communication system where in data packets are sent from a sending entity at a sending rate being modulated with a rate modulation to the transmission link which transmits the data packets according to its transmission capability to a receiving entity receiving the data packets at a receiving rate, the analysis entity comprising a receiving unit for receiving messages and information, a processing unit for processing messages and information, and a transmission unit for sending messages and information. The receiving unit is adapted to receive sending rate related information and to receive receiving rate related information, e.g. information from which the sending rate and the receiving rate can be calculated, respectively, or directly obtained. The processing unit being adapted to obtain the sending rate from the sending rate related information and to obtain the receiving rate from the receiving rate related information, and to compare the obtained sending rate and the obtained receiving rate to determine a relation of the obtained sending rate and the obtained receiving rate and to determine an appearance of the rate modulation of the sending rate in the obtained receiving rate, and to obtain the information about the transmission capability based on the relation and the appearance of the rate modulation.

The present invention also concerns a computer program comprising portions of software codes in order to implement the method as described above when operated at the analysis entity. The computer programs can be stored on a computer readable medium. The computer-readable medium can be a permanent or rewritable memory within the analysis entity or located externally.

The computer program can be also transferred to the analysis entity for example via a cable or a wireless link as a sequence of signals.

A computer program loadable into a processing unit of an analysis entity for obtaining a transmission capability of a transmission link in a communication system where in data packets are sent from a sending entity at a sending rate being modulated with a rate modulation to the transmission link which transmits the data packets according to its transmission capability to a receiving entity receiving the data packets at a receiving rate, the computer program comprising code to obtain the sending rate and the receiving rate, to compare the obtained sending rate and the obtained receiving rate to determine a relation of the obtained sending rate and the obtained receiving rate and to determine an appearance of the rate modulation of the sending rate in the obtained receiving rate, and to obtain the information about the transmission capability based on the relation and the appearance of the rate modulation.

DETAILED DESCRIPTION OF THE INVENTION

Figure 1:
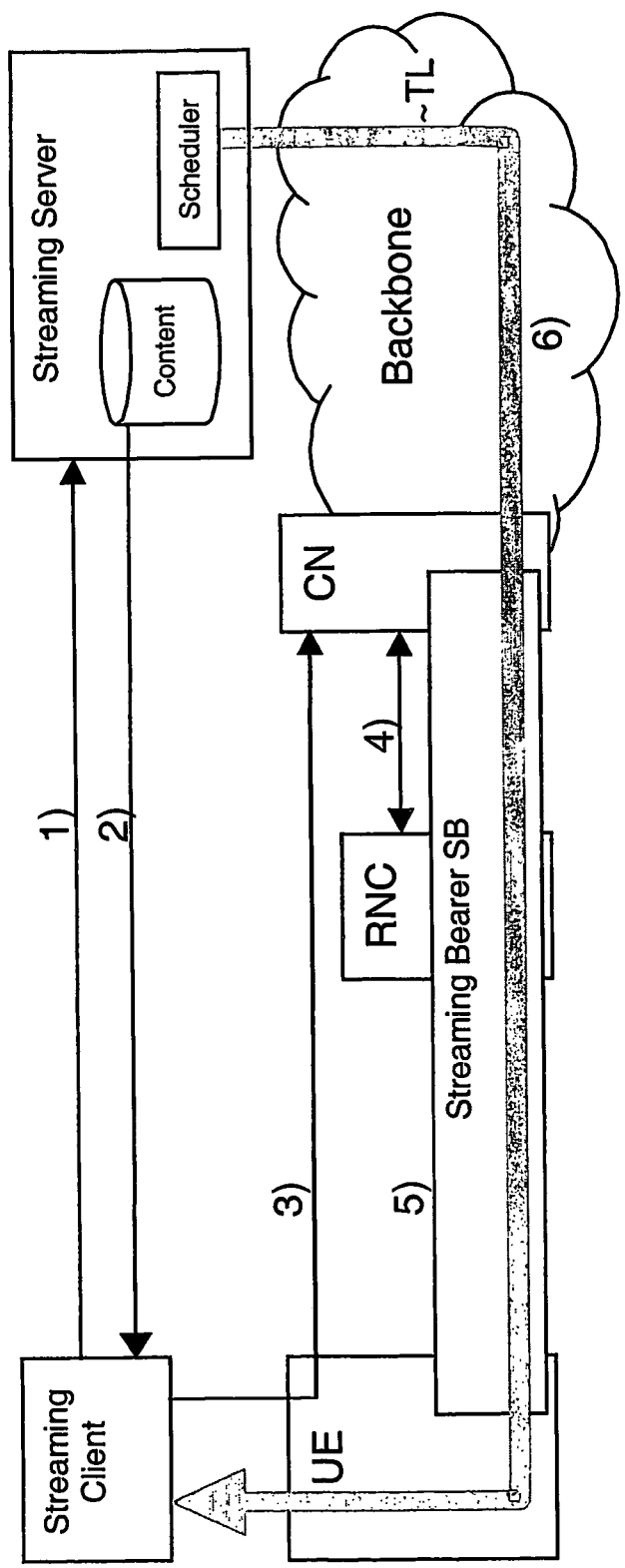
FIG. 1 illustrates entities and steps for setting-up a streaming bearer according to state of the art.
Figure 2:
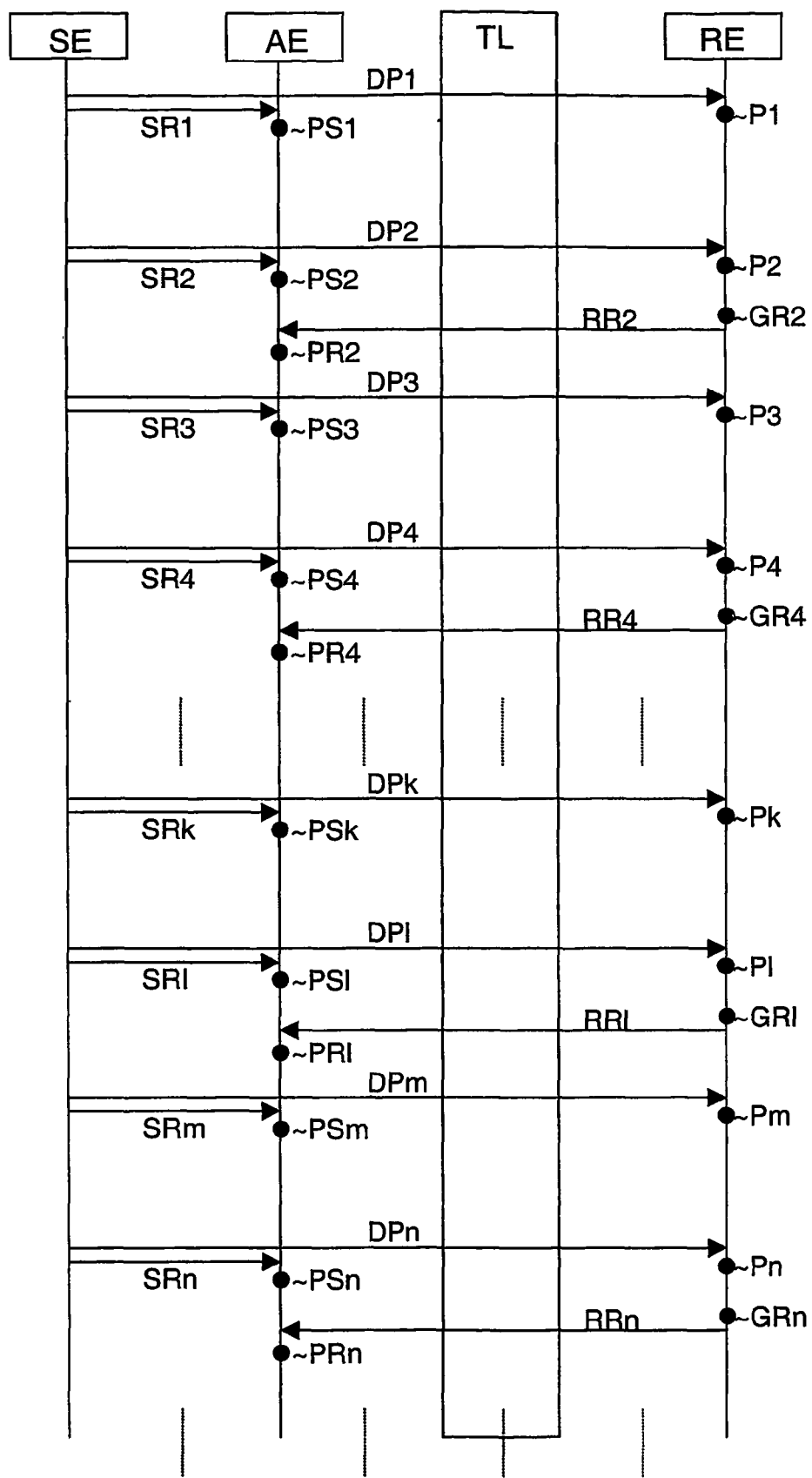
FIG. 2 illustrates a flow of messages between entities and processes carried out by entities according to a first embodiment of the invention.

FIG. 2 and Tables A and B are used to explain how the sending rate and the receiving rate can be obtained from sending rate related information and receiving rate related information, respectively. In FIG. 2, a sending entity SE, a transmission link TL, a receiving entity RE, and an analysis entity AE are depicted. Furthermore, messages between the respective entities and processes operated on the respective entities are shown.

The sending entity SE sends data packets DP1-DP4, . . . Dk-Dn, . . . via the transmission link TL to the receiving entity RE. According to the present example, the data packets are each associated with a sequence number 1,2,3,4, . . . ,k,l,m, n, . . . and the data packets are sent in the order of sequence. The data packets are sent at a modulated sending rate to the transmission link TL which transmits the data packets according to its transmission rate and buffer characteristics to the receiving entity. For each sent data packet, the sending entity SE reports SR1-SR4, . . . ,SRk-SRn, . . . sending rate related information to the analysis entity AE, which is according to the present example, the sequence number and the sending time of each sent data packet. Another example is to communicate directly information about the current sending rate on a per sequence number base from the sending entity SE to the analysis entity. The analysis entity stores the obtained sending rate related information in a database ordered in the sequence of the sequence numbers and/or sending times. Table A shows an example for the sending rate related information ordered according to the sequence numbers stored in a database:

TABLE A

Example for sending rate related information ordered according to sequence numbers

| Sequence Number of Data Packets | Sending Time | Data Amount |
|---|---|---|
| 1 | ts(1) | A(1) |
| 2 | ts(2) | A(2) |
| 3 | ts(3) | A(3) |
| 4 | ts(4) | A(4) |

TABLE A-continued

Example for sending rate related information ordered
according to sequence numbers

| Sequence Number of Data Packets | Sending Time | Data Amount |
|---|---|---|
| . | . | . |
| . | . | . |
| . | . | . |
| k | ts(k) | A(k) |
| l | ts(l) | A(l) |
| m | ts(m) | A(m) |
| n | ts(n) | A(n) |
| . | . | . |
| . | . | . |
| . | . | . |

At the receiving entity RE, the sent data packets DP1-DP4, . . . ,DPk-DPn, . . . are received and processed P1-P4,. . . ,Pk-Pn, . . . , e.g. according to an application on the receiving entity RE like a streaming multimedia presentation. At certain points in time, the receiving entity generates GR2, GR4, . . . ,GRl,GRn, . . . receiver reports for indicating to the analysis entity AE the amount of data received. According to the present example, the receiving entity RE generates receiver reports every time two of the data packets are received. The receiving entity determines the most progressed sequence number of the received data packets available at the time of generation of each receiver report and includes this sequence number into the corresponding receiver report. e.g. the receiver report generated at step GR4 includes the sequence number of the data packet DP4 which is 4 according to the present example and being the most progressed sequence number available at the moment of the generation GR4 of the receiver report. After the generation of a receiver report, the receiving entity RE sends said receiving report preferably immediately to the analysis entity AE. The sent RR2,RR4, . . . ,RRl,RRn, . . . receiver reports are received at the analysis entity AE according to the sequence of the sending. The analysis entity AE determines PR2, PR4, . . . ,PRl,PRn, . . . the receiving time for each received receiver report and the respective included sequence number, i.e. 2,4, . . . l,n . . . according to the present example, as receiving rate related information.

The present example according to FIG. 2 uses for explanation of the obtaining of the receiving rate related information a rule, wherein for every second received data packet a receiver report is generated and sent. Other rules based on predetermined numbers of data packets are possible, e.g. after the reception of each of the data packets or rules defined by a higher number of received data packets. When using a rule according to a predetermined number of received data packets, the duration of the interval, i.e. the time between two subsequent receiver reports, may vary depending on the receiving rate which itself depends on the relation of the sending rate and the transmission capability.

Alternatively, the receiving entity RE may generate and send the receiver reports according to a predetermined temporal interval as another example for a rule wherein the indicated data amount for each receiver report, e.g. the sequence number, may vary according to the receiving rate which itself depends on the relation of the sending rate and the transmission capability. Other rules are possible, however, the examples illustrate that the receiving times and the included sequence numbers provide the analysis entity with sufficient information to calculate at least the receiving packet rate at the receiving entity as explained later in more detail. Table B illustrates an example for the obtained receiving rate related information ordered according to the included sequence number.

| Included Sequence Number | Receiving Time |
|---|---|
| 2 | tr(2) |
| 4 | tr(4) |
| . | . |
| . | . |
| . | . |
| L | tr(l) |
| N | tr(n) |
| . | . |
| . | . |
| . | . |

Based on the obtained sending rate related data information, the analysis entity can calculate the sending rate. For example it can use the formula $Rs(l,k)=(SN(l)-SN(k))/(ts(l)-ts(k))=\Delta SN(l,k)/\Delta ts(l,k)$ to calculate a packet rate with SN(l) and SN(k) being sequence numbers l and k associated to the sent data packets resulting in the obtained packet sending rate for the data packets DPl and DPk.

Similarly, the receiving rate Rr can be calculated from the obtained receiving rate related information by using the formula $Rr(n,l)=(SNr(n)-SNr(l))/tr(n)-tr(l)=\Delta SNr(n,l)/\Delta tr(n,l)$ giving a packet rate with SN(n) and SN(l) being included sequence numbers n and l as provided by the receiving entity RE. Other ways of calculating the sending rate and the receiving rate are possible.

The sending rate and the receiving rate can be obtained by considering the data amount of data packets, which can be advantageous when the data amount of the sent data packets is not constant. The sending rate Rs can be calculated for the sending time ts(l) by e.g.

$$Rs(l)=8\times A(k)/\Delta ts(l,k)$$

with A(k) the data amount of data packet DPk sent at the sending time ts(k) being sent previous to the data packet DPl sent at sending time ts(l).

The receiving rate Rr can be calculated by dividing the amount of data received at the receiving entity RE between two consecutive receiver reports by the time difference between the two receiver reports, i.e.

$$Rr(n)=8\times(A(n)+A(l))/\Delta tr(n,l)$$

for the present example where in the time interval $\Delta tr(n,l)$ two data packets DPn and DPl are comprised.

Based on the obtained sending rate related information and the receiving rate related information, the evolution of the sending rate and the receiving rate over time and/or sequence number can be obtained. By doing so, the rate modulation of the sending rate and, if allowed by the transmission capability, of the receiving rate can be made apparent to the analysis entity AE. A curve representing the evolution of the sending rate and a curve representing the evolution for the receiving rate can be created. The curves can be compared, e.g. subtracted, which gives to the analysis entity AE information about the relation of the sending rate and the receiving rate and from the evolution of the curve for the obtained receiving rate the appearance of the modulation can be determined. Preferably, the curves are compared on the base of sequence numbers which are according to the present example the included sequence numbers which provides that time delays of the curves can be de-calibrated which enhances the accuracy of the method due to the phase-match of both curves.

Figure 3:
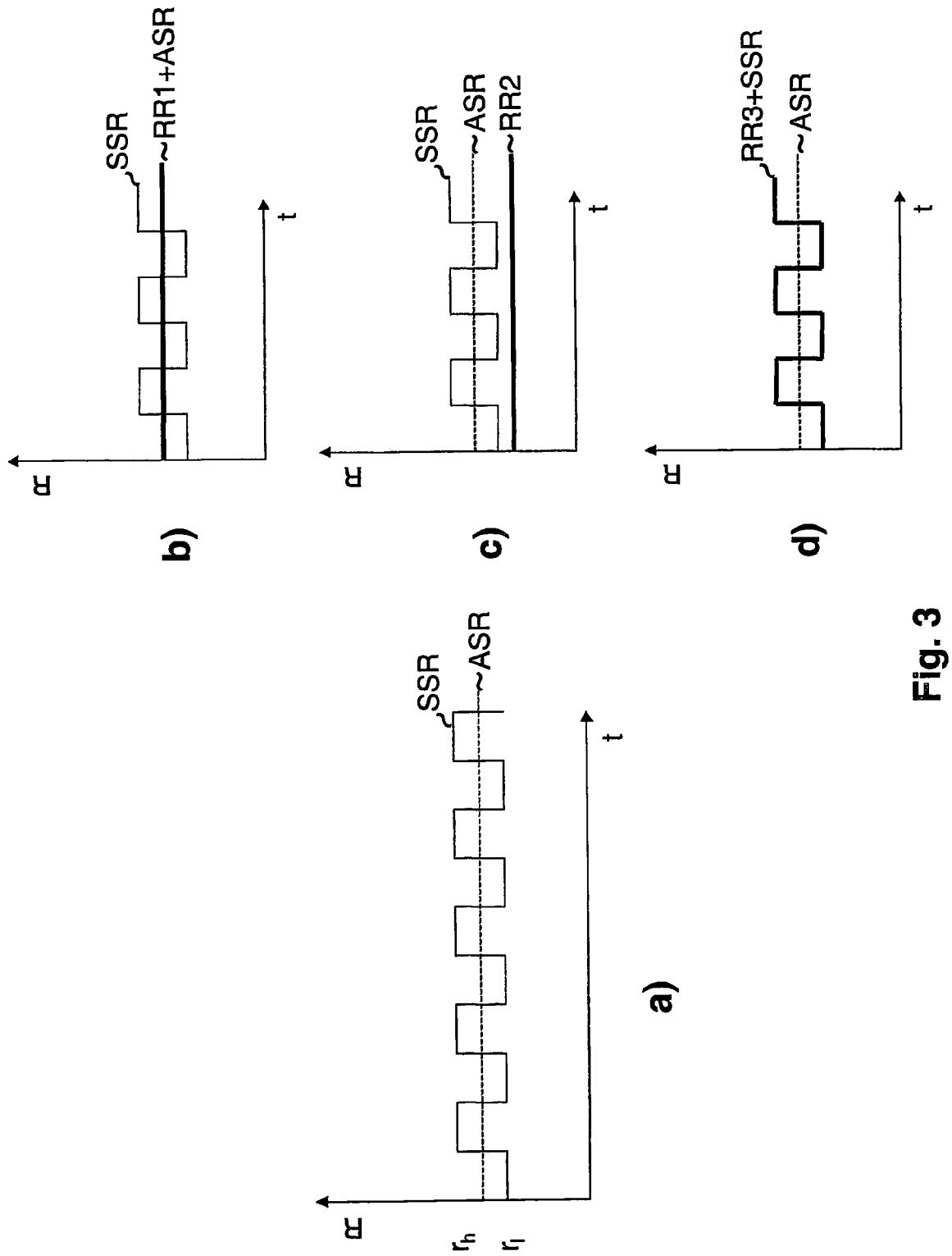
FIG. 3a)-d) illustrates a first example for rate curves over time according to the present invention.
Figure 4:
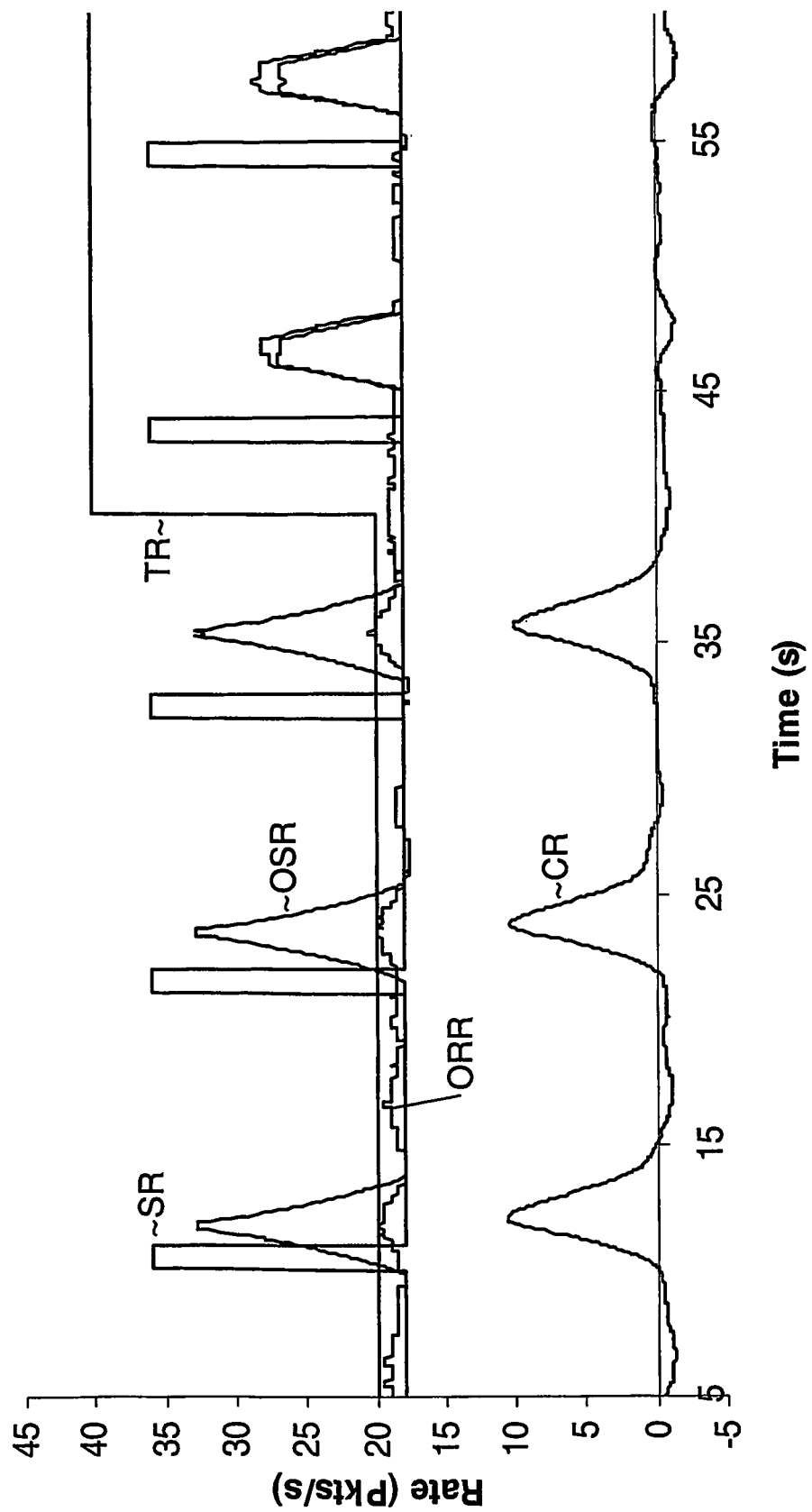
FIG. 4 illustrates a second example for rate curves over time according to the present invention.

The obtaining of the transmission capability of a transmission link according to the present invention is explained in more detail in conjunction with FIG. 3 and FIG. 4. According to the basic principle of the invention, a modulated sending rate is fed into the transmission link and the transmission capability of the transmission link is obtained by comparing the receiving rate and the sending rate.

It can be advantageous to execute the obtaining of the sending rate and the receiving rate and the necessary comparing step for the obtaining of the information about the transmission capability "on-line", i.e. in parallel and consecutively with the obtaining of the respective rate related information in order to obtain the information about the transmission capability as early as possible. The same applies for the obtaining of the sending rate and/or the receiving rate based on explicit rate communication from the respective entity to the analysis entity. Thus, obtaining the information about the transmission capability "on-line" reveals up-to-date information and offers the opportunity for the analysis entity to initiate appropriate actions based on the obtained information about the transmission capability as early as possible.

The obtained information about the transmission capability can be communicated from the analysis entity AE to the sending entity SE (not shown in FIG. 2) thus providing feedback on the current transmission rate to the sending entity SE. The communication of the obtained information about the transmission capability may be omitted if the obtained information about the transmission capability matches one or more predefined criteria thus being an implicit communication of the information about the transmission capability to the sending entity SE. As an example, the sending entity SE may not be interested in receiving information about the transmission rate if the analysis entity obtains that the transmission rate exceeds or is equal to the sending rate. If the predetermined criteria are not matched the analysis entity can explicitly inform the sending entity SE about the mismatch. This procedure reduces the signaling effort. Alternatively or in addition the analysis entity AE may send an instruction to the sending entity SE based on the obtained information about the transmission capability, e.g. sending rate to be increased by 30%.

Natural fluctuations of the sending rate can in principle provide for the rate modulation, however, very sensitive detection is required for detecting the natural fluctuations both in the sending rate related information and the receiving rate related information. Therefore, from a detection point of view, a controlled rate modulation of the sending rate with a rate modulation adapted to the detection sensitivity of the analysis entity is preferred. Furthermore, buffers installed in the transmission link typically are used to compensate fluctuations further supporting the usage of a controlled rate modulation.

Therefore, the usage of a controlled rate modulation can achieve an adaptation of the rate modulation to the detection sensitivity of the analysis entity. Furthermore, it provides that the rate modulation can be adjusted to the transmission capability of the transmission link e.g. in order to avoid buffer overflow in the transmission link or a buffer underflow at the receiving entity. Adjusting the rate modulation to the transmission capability may be achieved e.g. based on pre-known information about the transmission link like a maximum and minimum transmission capability and/or based on the obtained information about the transmission capability. The usage of a controlled rate modulation is furthermore supported to obtain extended and more accurate information about the transmission capability of the transmission link, e.g. it is possible to detect if the transmission rate is below, equal, or above the sending rate and/or it is possible to detect if a buffer is empty, partly filled or full.

FIG. 3a) shows a modulated sending rate SSR which is entered into the transmission link. The modulated sending rate SSR consists of an unmodulated average sending rate ASR, which is e.g. a rate like a content rate at which data packets should be in average sent to and received at the receiving entity, and a rate modulation with which the average sending rate ASR is modulated. In this example, the average sending rate ASR is modulated by a rectangular rate modulation with an amplitude of (rh-rl)/2. No rate offset is introduced by the rate modulation thus the average of the modulated sending rate SSR matches the (unmodulated) average sending rate ASR. Apart from the rectangular rate modulation, which generates traffic with rectangular rate characteristics, other rate modulation schemes like sawtooth or sinewave(s) or peak-like as depicted in FIG. 4 can be applied.

FIG. 3b)-d) show examples for the receiving rate RR1, RR2,RR3 as obtainable according to the present invention for different relations of the modulated sending rate SSR and the transmission capability (not shown) of the transmission link comprising firstly a buffer and secondly a part that defines the transmission rate in average. In FIG. 3b) the obtained receiving rate RR1 is unmodulated and equals the average sending rate ASR. In FIG. 3c) the obtained receiving rate RR2 is also unmodulated but its rate value is below the average sending rate ASR. In FIG. 3d), the obtained receiving rate RR3 is identical to the modulated sending rate SSR.

In FIG. 3d), the modulated sending rate SSR is below the transmission rate and the buffer is empty which results in that the rate modulation according to the modulated sending rate SSR is visible in the obtained receiving rate RR3. In FIG. 3c), the obtained receiving rate RR2 is below the average sending rate ASR which indicates that the transmission rate is lower than the average sending rate ASR. In FIG. 3b), the transmission rate is equal to the average sending rate ASR and the rate modulation amplitude and rate change frequency have been chosen such that the buffer is always partly filled. This results in that the fractions of the rate modulation undershooting the transmission rate are not visible in the obtained receiving rate RR1, because the buffer compensates the rate modulation unless the buffer is empty. If the buffer is not empty, the inflow of data packets into the buffer installed before the part of the transmission link that defines the transmission rate in average occurs at the modulated sending rate SSR and the outflow occurs at the average sending rate ASR. If the buffer is empty, the outflow of the data packets occurs—as mentioned above—at the scheduled sending rate SSR.

Thus. from the comparing of the modulated sending rate SSR and the obtained receiving rates RR1,RR2,RR3, a relation between both rates can be obtained. According to the present example, the offset rate value between the average sending rate ASR and the receiving rate RR1,RR2,RR3 represents the relation. The obtained receiving rate RR2 has negative offset rate value to the average sending rate ASR which indicates that the transmission rate is lower than the sending rate. The offset value is zero between the average sending rate ASR and the obtained receiving rates RR!,RR3 indicating that the transmission rate is equal to or above the sending rate.

The determination of an appearance of the rate modulation in the obtained receiving rate can be achieved by analyzing the temporal evolution of the obtained receiving rate. The obtained receiving rate RR3 reveals the rate modulation indicating that the transmission rate is above the sending rate and the buffer is empty. The receiving rates RR1,RR2 do not reveal any rate modulation corresponding to the rate modulation of the sending rate indicating in conjunction with the respective determined relations, that the transmission rate is below the sending rate and the buffer is subsequently filled according to the example for FIG. 3c) and the transmission rate is equal to the sending rate and the buffer is partly filled according to the example for FIG. 3b)

Absolute values for the transmission capability can be also determined, e.g. by comparing the average value for the obtained sending rate to the average value of the obtained receiving rate for the case that the transmission rate is below the sending rate. The modulated sending rate ASR, i.e. the average sending rate SSR and/or the modulation rate, can be adjusted to the transmission capability in order to detect absolute values for the transmission capabilities. Consideration of pre-known values for the transmission capability can enhance the speed and accuracy of the obtaining of the information about the transmission capability according to the invention, e.g. if the transmission link has three possible transmission rates with three pre-known rate values T1, T2, and T3 with T1<T2<T3 and the analysis entity obtains from the comparison that the obtained receiving rate has a modulation rate according to the modulation rate of the sending rate and the obtained average receiving rate is equal to the obtained average sending rate at the second rate value T2, the sending entity can directly conclude that the current transmission rate must be the third transmission rate with the rate value T3.

By varying the modulation rate amplitude and/or modulation rate offset and comparing the obtained receiving rate versus the obtained sending rate the information about the buffer like the buffer size and fill grade can be obtained accordingly (not shown in FIG. 3). Thus, the knowledge about the buffer can be obtained by the method itself. Alternatively or in addition, the knowledge about the existence and the size of the buffer can be provided to the analysis entity, e.g. during installation of the analysis entity or the transmission link.

FIG. 4 illustrates a second example for rate curves over time according to the present invention. Depicted in the upper part of FIG. 4 are the modulated sending rate SR at which the data packets are sent from the sending entity into the transmission link, the transmission rate TR of the transmission link, the obtained sending rate OSR as obtained by the analysis entity, the obtained receiving rate ORR as obtained by the analysis entity and in the lower part a compared rate curve CR which is created by the difference of the obtained sending rate OSR and the obtained receiving rate ORR over time.

The obtained sending rate can differ from the sending rate as illustrated in FIG. 4. Here, the sending rate is obtained based on sending rate related information derived from sender reports, e.g. comprising each a sending time and a sequence number of a sent data packet, which can effect a slight degradation of the peak-like rectangular rate modulation of the sending rate SR in the obtained sending rate OSR at the analysis entity. However, the rate modulation of the obtained sending rate OSR can be clearly resolved by the analysis entity. Similarly, the obtained receiving rate ORR can be degraded due to the obtaining process.

In the simulation according to FIG. 4, the sender reports are transmitted via the transmission link, which explains the slight dependence of the rate modulation amplitude of the obtained sending rate OSR on the transmission rate TR. In this simulation, the analysis entity has been located at the receiving entity, which is one way of implementing the present invention.

For the first three sending rate periods, the transmission rate of the transmission link matches the average sending rate (not shown) resulting in a suppression of the rate modulation in the obtained receiving rate ORR thus the rate modulation of the sending rate becomes clearly visible in the compared rate curve CR. At a certain point in time, the transmission rate switches to a higher value resulting in that the rate modulation in the obtained receiving rate ORR becomes clearly apparent which effects that the compared rate curve CR is no longer modulated. Thus from the subtraction of the obtained receiving rate ORR from the obtained sending rate OSR and the analysis for the appearance of the rate modulation in the compared rate curve CR, the analysis entity can conclude to the transmission capability, i.e. according to the present example, the analysis entity can obtain that for the first three rate periods the transmission rate TR matches the sending rates and after that time, an up-switch of the transmission rate TR occurs. A down-switch of the transmission rate is not depicted in FIG. 4 but can be detected and quantified by a negative rate offset value of the modulated compared rate curve CR.

Figure 5:
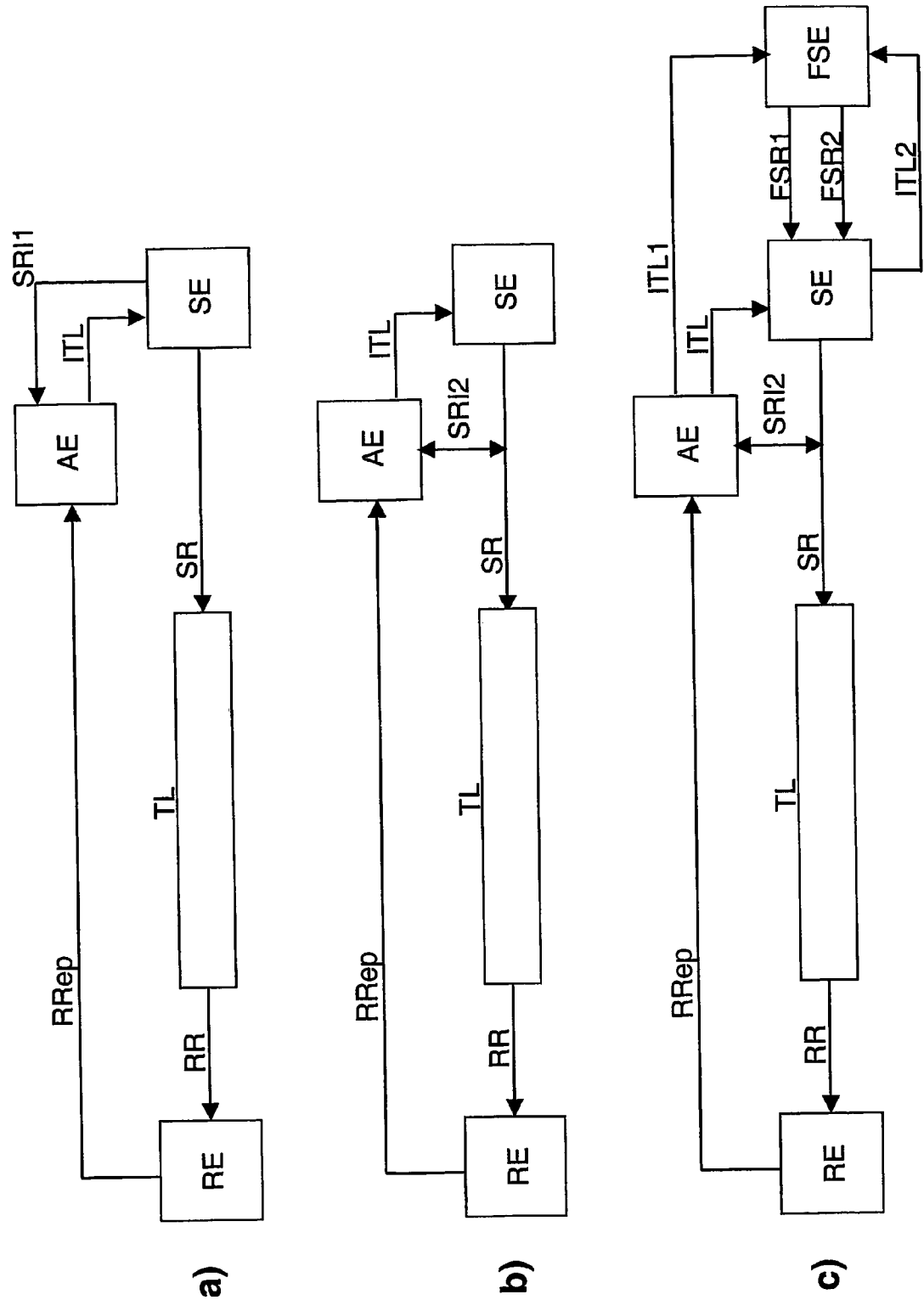
FIG. 5a)-c) illustrate different embodiments of system architectures and data flows according to the present invention.

FIG. 5a)-c) depicts different embodiments of system architectures and data flows according to the present invention. In all embodiments, the sending entity SE sends data packets at a sending rate SR via the transmission link TL to the receiving entity RE. Receiver reports RRep are sent from the receiving entity RE to the analysis entity AE, which obtains the receiving rate according to the present invention based on the received receiver reports RRep and the determined receiving times. FIG. 5a) and FIG. 5b) differ in the way how the sending rate is obtained by the analysis entity AE.

According to FIG. 5a), the sending entity SE communicates SRI1 the sending rate SR to the analysis entity AE. In FIG. 5b), the analysis entity AE monitors SRI2 the data packets and obtains the sending rate from sending rate related information, e.g. packet size and packet sending time, from the monitored data packets. This embodiment may be preferable as no explicit communication between the sending entity SE and the analysis entity AE has to take place. For both embodiments, the analysis entity AE can send one or more messages ITL to the sending entity SE for informing the sending entity SE about the obtained information about the transmission capability and/or for instructing the sending entity based on the obtained information about the transmission capability.

FIG. 5c) is an extension of FIG. 5b) in a way that the sending entity SE receives the data packets at two further sending rates FSR1, FSR2 from a further sending entity FSE. The sending entity SE can select one of the further sending rates FSR1,FSR2 as sending rate SR and can effect a modulation. The analysis entity AE can inform the sending entity SE with the information about the transmission capability of the transmission link TL by one or more messages ITL and the further sending entity FSE by one or more messages ITL1 and/or messages ITL2 via the sending entity. The latter solution of informing the further sending entity via one or more messages ITL and ITL2 may be preferred as no direct communication between the analysis entity AE and the further sending entity FSE has to take place. The information about the transmission capability and/or an appropriate instruction can effect that the sending entity SE and/or the further sending entity FSE adjust its respective sending rates.

In a preferred embodiment of case 5c), the further sending entity sends data packets at atg least two further sending rates. Based on the information about the transmission capability, the sending entity selects one of the at least two further sending rates from the further sending entity as the sending rate and effects the modulation. If the transmission capability changes and thus the communicated information about the transmission capability, the sending entity may switch to another one of the at least two further sending rates from the further sending entity and effects the modulation. Messages ITL1 and ITL2 may be not foreseen.

Figure 6:
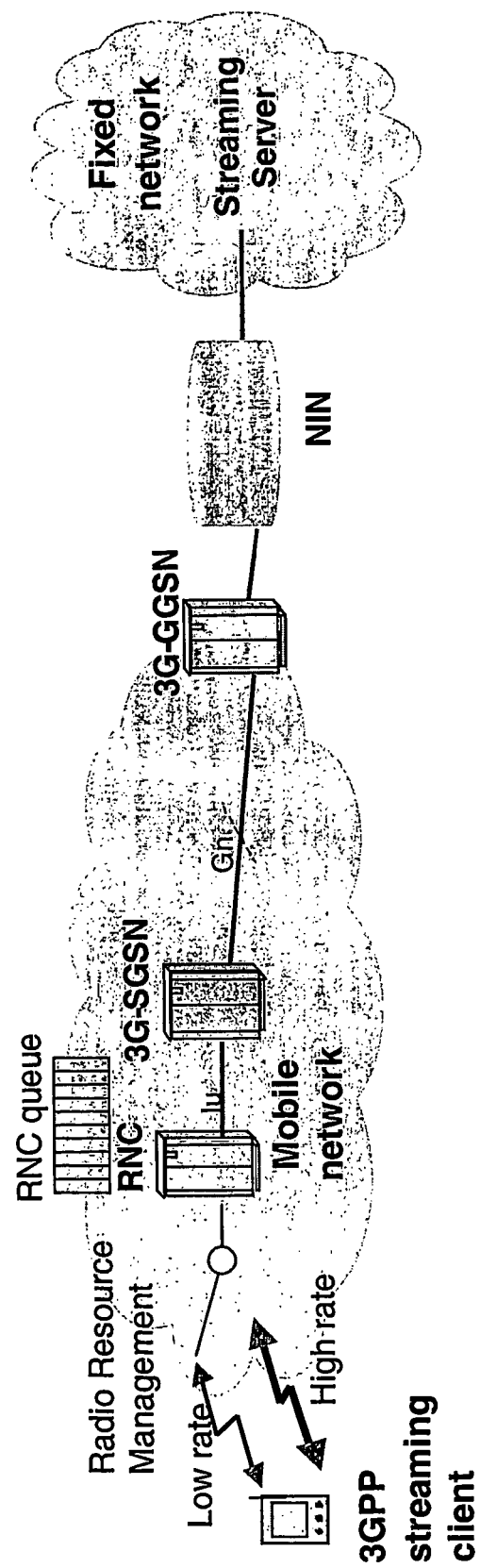
FIG. 6 illustrates an embodiment of a proxy-based streaming architecture according to the present invention.

The four entities SE, FSE, RE, AE can be located on a common platform. e.g. in a single housing, or could be partly or totally separated. A preferred implementation is shown in FIG. 6 for a streaming application for a communication network according to the UMTS standard. The system comprises a streaming server acting as further sending entity, a streaming proxy NIN, acting as sending entity and analysis entity, and a transmission link comprising a (3rd Generation Gateway GPRS (General Packet Radio Service) Support Node) 3G-GGSN connected via a Gn interface to a (3rd Generation GPRS Support Node) 3G-SGSN connected via a Iu interface to a (Radio Network Controller) RNC comprising a RNC queue acting as buffer connected further via a wireless interface to a (3rd Generation Partnership Project) 3GPP compliant user equipment and further to the 3GPP streaming client acting as receiving entity. In such a system, the wireless link is typically the bottleneck link which can be operated at different transmission rates, e.g. at a low rate (e.g. 32 kBit/sec) and a high rate (e.g. 64 kBit/sec). Furthermore, the wireless link can be realized as an elastic bearer with the radio resource management switching the transmission rate of the wireless link during a streaming session.

From a view of the operator of the streaming server it could be preferable to install the sending entity and the analysis entity on the streaming server such that no proxy node is required. However, the farer the analysis entity is located from the part of the transmission link whose transmission capability should be obtained, i.e. in the case of FIG. 6 the wireless link, the more difficult and time consuming the obtaining becomes, because parts of the transmission link between the analysis entity and the receiving entity that are not of interest could overlay the transmission characteristic of the part that the analysis entity is interested in. In addition, the obtaining is delayed just because of the distance and the number of routers and interfaces between the analysis entity and the part of the transmission link the analysis entity is interested in. In addition, the obtaining of the receiving rate related data like sequence numbers and receiving times can become more affected by jitter thus lowering the quality of the obtained receiving rate and thus the obtainable information about the transmission link.

However, placing an analysis entity very close to a wireless link is technically possible but often not wanted because of standardization effort needed to install the analysis entity close to the wireless link and for the communication of analysis entity with the receiving entity and the sending entity according to the present invention. In addition, as typically many wireless transmission links exists, many analysis entities have to be installed and operated which is not favorable from a business point of view. Another business concern could be that a operator of a mobile network may not want to install dedicated analysis entities close to the wireless links that cause traffic in the core network for the communication of the obtained transmission capability to the streaming server.

Therefore, the realization according to FIG. 6 is a good compromise that enables an easy implementation from standardization and business point of view and is, in addition, rather close to the wireless communication network such that a rather good quality of the information about the transmission capability of the transmission link from the streaming proxy to the receiving entity can be achieved, because rate fluctuations introduced by the fixed network can be omitted by suitable buffering in the streaming proxy.

The analysis entity on the streaming proxy can obtain an initially assigned transmission rate, e.g. the transmission rate of the wireless link indicated by low rate, being e.g. lower than the initial sending rate at which the data packets are initially sent from the sending entity on the streaming proxy into the transmission link. The analysis entity can signal the obtained information about the initial transmission rate, i.e. the low rate, or an appropriate instruction to the sending entity that can adjust the sending rate accordingly. Based on the present invention, the analysis entity can also detect an up-switch, e.g. when the transmission rate is switched from low-rate to high-rate, which can be signaled to the sending entity on the proxy for adjusting the sending rate. Similar applies for a down-switch. The obtained information about the transmission capability or an appropriate instruction can be send in addition or alternatively to the streaming server for adjusting the further sending rate, e.g. the content rate.

Figure 7:
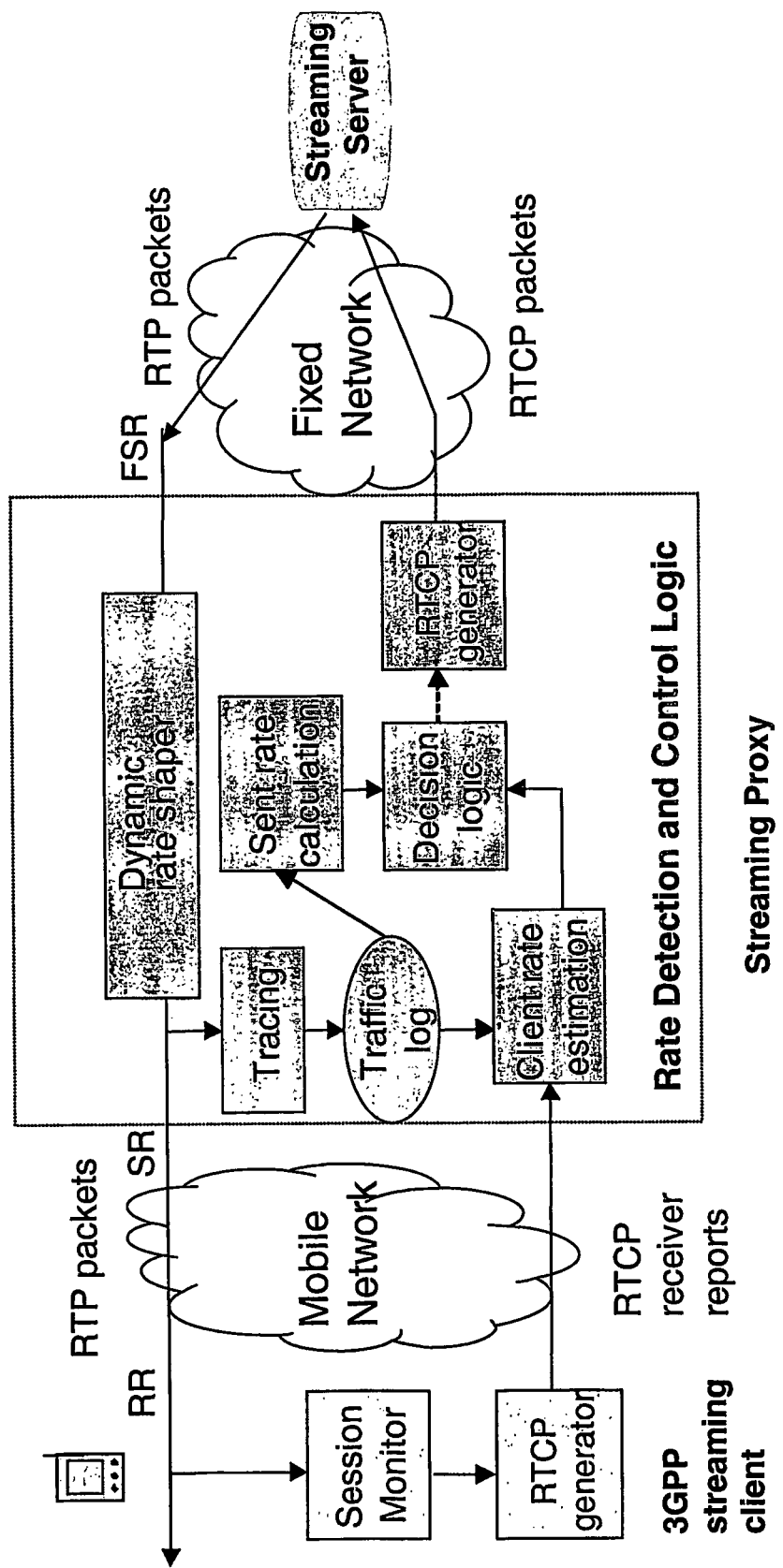
FIG. 7 illustrates an embodiment of a rate detection and control logic at a streaming proxy according to the present invention.

FIG. 7 shows a similar architecture as in FIG. 6, but reveals in addition a more detailed description of an embodiment of the analysis entity in the streaming proxy. Data packets according to,(Real-Time Protocol) RTP are sent at a further sending rate FSR from the streaming server to the streaming proxy. The streaming proxy sends the RTP packets at the sending rate SR via the transmission link of the mobile network to the UE and the streaming client, which receives the RTP packets at the receiving rate RR. The streaming proxy comprises a dynamic rate shaper for modulating the sending rate with a rate modulation. The dynamic rate shaper may be optional if the further sending rate FSR is already modulated in way that the modulation passes to the transmission link and the modulation rate can be detected and analyzed by the analysis entity.

The streaming proxy further comprises a tracing module that obtains sending rate related information, e.g. sequence number and sending time of each sent data packet, and stores the sending rate related information in a traffic log. Based on the data stored in the traffic log, the sending rate, e.g. over time and/or sequence number, can be calculated in a sent rate calculation entity. (Real-Time protocol Control part Protocol) RTCP receiver reports, generated at the receiving entity via a session monitor and a RTCP generator, are received at the streaming proxy. A RTCP receiver report indicates the most progressed sequence number of the sequence numbers of the data packets available at the moment of the generation of the RTCP receiver report. For each of the RTCP receiver reports the respective included most progressed sequence number and the respective receiving time, i.e. the time an receiver report is received at the analysis entity, can be obtained by a client rate estimation module, which can include e.g. a timer or clock (not shown) for the determination of the receiving times. Furthermore, the client rate estimation module can calculate the receiving rate from the obtained sequence numbers and the receiving times, optionally considering the data amount. Furthermore, the streaming proxy may comprise a database (not shown) for storing the obtained receiving rate and/or the obtained sending rate, e.g. over time and/or sequence numbers.

The obtained sending rate and the obtained receiving rate are fed from the sent rate calculation module and the client rate estimation module, respectively, into a decision logic where both rates are compared, e.g. over time and/or sequence number) and the information about the transmission capability is obtained according to the present invention. Depending on the implementation, this information may be used to change the sending rate of the proxy server, e.g. by adjusting the sending rate by the dynamic rate shaper. Alternatively, the streaming proxy can generate by an RTCP generator an RTCP report comprising the obtained information about the transmission capability and/or an appropriate instruction derived from the obtained information about the transmission capability and can send this RTCP report to the streaming server, which can react by switching to a further sending rate on the base of the information and/or instruction comprised in the RTCP report.

The invention claimed is:

1. A method for obtaining information about a transmission capability of a transmission link (TL), wherein a sending entity (SE) sends data packets at a sending rate to the transmission link (TL) which transmits the data packets according to its transmission capability to a receiving entity (RE) receiving the data packets at a receiving rate, the method comprising:
   modulating the sending rate with a rate modulation; and
   executing the following steps by an analysis entity (AE), the AE monitoring data flow between the SE and the RE over the TL:
      obtaining a measurement of the sending rate over at least a portion of a period of time in which the sending rate is modulated;
      obtaining a measurement of the receiving rate over at least the portion of the period of time in which the sending rate is modulated;
      comparing the obtained measurement of the sending rate and the obtained measurement of the receiving rate to determine a relation of the obtained measurement of the sending rate and the obtained measurement of the receiving rate;
      determining whether the rate modulation of the sending rate substantially affects the receiving rate based on the determined relation; and
      obtaining the information about the transmission capability based on the determination of whether the rate modulation of the sending rate substantially affects the receiving rate.

2. The method according to claim 1, wherein the obtained information about the transmission capability is at least one of information about a transmission rate of the transmission link, information about a relationship of the transmission rate versus the sending rate, and information about a status of a buffer of the transmission link.

3. The method according to claim 1, wherein the modulated obtained sending rate is separated into a fraction having the rate modulation and a fraction having not the rate modulation and the obtained receiving rate is separated into a fraction having the rate modulation and a fraction having not the rate modulation and the fraction of the sending rate having not the rate modulation is compared to the fraction of the receiving rate having not the rate modulation to determine the relation and the fraction of the receiving rate having the rate modulation is analyzed for detecting the rate modulation.

4. The method according to claim 1, wherein the obtained sending rate and the obtained receiving rate are subtracted and the subtracted signal is analyzed to determine the relation and the presence of the rate modulation.

5. The method according to claim 1, wherein the data packets are sent from the sending entity to the receiving entity end-to-end on a first layer and the transmission capability of the transmission link is defined by a second layer being a non end-to-end layer below the first layer and at least one of the sending rate and the receiving rate are obtained based on information from the first layer or one or more end-to-end layers above the first layer.

6. The method according to claim 1, wherein the sending rate and the receiving rate are obtained and compared on the base of sequence numbers associated to the data packets over time.

7. The method according to claim 1, wherein at least one of the sending rate and the receiving rate are communicated to the analysis entity.

8. The method according to claim 1 wherein the analysis entity obtains receiving rate related information on the base of sequence numbers by receiving receiver reports from the receiving entity, each receiver report being received at a receiving time at the analysis entity which determines for each receiver report the respective receiving time and a respective included sequence number, each included sequence number indicating the most progressed of the sequence numbers available at the time of the generation of the respective receiver report at the receiving entity, and the analysis entity calculates the obtained receiving rate on the base of the receiving rate related information.

9. The method according to claim 8 wherein the receiver reports are generated and sent from the receiving entity according to a rule and the rate modulation of the sending rate is adjusted to the rule.

10. The method according to claim 8, wherein the receiver reports comply with the Real-Time protocol Control part Protocol (RTCP).

11. The method according to claim 1, wherein the data packets comply with the Real-Time Protocol (RTP).

12. The method according to claim 1 wherein the sending rate is adjusted to at least one of pre-known information about one or more possible transmission capabilities of the transmission link and the obtained information about the transmission capability.

13. The method according to claim 1, wherein the transmission capability is adjusted based on the obtained information about the transmission capability.

14. The method according to claim 1, wherein the sending entity receives the data packets at one or more further sending rates from a further sending entity and, based on the obtained information about the transmission capability, the sending entity is instructed to send the data packets to the transmission link at a new sending rate according to one of the one or more further sending rates.

15. The method according to claim 14, wherein the one or more further sending rates are not modulated with the rate modulation and the sending entity effects the rate modulation of the new sending rate.

16. The method according to claim 1 wherein the analysis entity and the sending entity are located on a streaming server.

17. The method according to claim 14, wherein the analysis entity and the sending entity are located on a proxy server and the further sending entity is located on a streaming server.

18. The method according to claim 1, wherein the analysis entity is located at the receiving entity.

19. The method according to claim 1, wherein the transmission link comprises a wireless link of a mobile communication network.

20. An analysis entity (AE) for obtaining a transmission capability of a transmission link (TL) in a communication system where in data packets are sent from a sending entity (SE) at a sending rate being modulated with a rate modulation to the transmission link (TL) which transmits the data packets according to its transmission capability to a receiving entity (RE) receiving the data packets at a receiving rate, the analysis entity (AE) comprising a receiving unit for receiving messages and information, a processing unit for processing the messages and information, wherein the processing unit comprises a microprocessor, a main memory coupled to the microprocessor, and persistent storage, the microprocessor executing instructions for obtaining the transmission capability of the TL; and a transmission unit, coupled to the processing unit, for sending the messages and information, wherein the processing unit is adapted to:

obtain a measurement of the sending rate over at least a portion of a period of time in which the sending rate is modulated; and obtain a measurement of the receiving rate over at least the portion of the period of time in which the sending rate is modulated;

compare the obtained measurement of the sending rate and the obtained measurement of the receiving rate to determine a relation of the obtained measurement of the sending rate and the obtained measurement of the receiving rate;

determine whether the rate modulation of the sending rate substantially affects the receiving rate based on the determined relation; and obtain the information about the transmission capability based on the determination of whether the rate modulation of the sending rate substantially affects the receiving rate.

21. The analysis entity according to claim 20, wherein the obtained information about the transmission capability is at least one of information about a transmission rate of the transmission link, information about a relationship of the transmission rate versus the sending rate, and information about a status of a buffer of the transmission link.

22. The analysis entity according to claim 20, wherein the obtained sending rate is separated into a fraction having the rate modulation and a fraction having not the rate modulation and the obtained receiving rate is separated into a fraction having the rate modulation and a fraction having not the rate modulation and the fraction of the sending rate having not the rate modulation is compared to the fraction of the receiving rate having not the rate modulation to determine the relation and the fraction of the receiving rate having the rate modulation is analyzed for the presence of the rate modulation.

23. The analysis entity according to claim 20, wherein the obtained sending rate and the obtained receiving rate are subtracted and the subtracted signal is analyzed to determine the relation and the presence of the rate modulation.

24. The analysis entity according to claim 20, wherein the data packets are sent from the sending entity to the receiving entity end-to-end on a first layer and the transmission capability of the transmission link is defined by a second layer being a non end-to-end layer below the first layer and at least one of the sending rate and the receiving rate are obtained based on information from the first layer or one or more end-to-end layers above the first layer.

25. The analysis entity according to claim 20, wherein the sending rate and the receiving rate are obtained and compared on the base of sequence numbers associated to the data packets over time.

26. The analysis entity according to claim 20, wherein at least one of the sending rate and the receiving rate are communicated to the analysis entity.

27. The analysis entity according to claim 20, wherein the analysis entity further comprises means for obtaining receiving rate related information on the base of sequence numbers by receiving receiver reports from the receiving entity, each receiver report being received at a receiving time at the analysis entity which determines for each receiver report the respective receiving time and a respective included sequence number, each included sequence number indicating the most progressed of the sequence numbers available at the time of the generation of the respective receiver report at receiving entity, and the analysis entity calculates the obtained receiving rate on the base of the receiving rate related information.

28. The analysis entity according to claim 20, wherein the receiver reports are generated and sent from the receiving entity according to a rule and the rate modulation of the sending rate is adjusted to the rule.

29. The analysis entity according to claim 20, wherein the receiver reports comply with the Real-Time protocol Control part Protocol (RTCP).

30. The analysis entity according to claim 20, wherein the data packets comply with the Real-Time Protocol (RTP).

31. The analysis entity according to claim 20, further comprising means for adjusting to at least one of pre-known information about one or more possible transmission capabilities of the transmission link and the obtained information about the transmission capability.

32. The analysis entity according to claim 20, further comprising means for adjusting the transmission capability based on the obtained information about the transmission capability.

33. The analysis entity according to claim 20, wherein the sending entity receives the data packets at one or more further sending rates from a further sending entity and, based on the obtained information about the transmission capability, the sending entity is instructed to send the data packets to the transmission link at a new sending rate according to one of the one or more further sending rates.

34. The analysis entity according to claim 20, wherein the one or more further sending rates are not modulated with the rate modulation and the sending entity effects the rate modulation of the new sending rate.

35. The analysis entity according to claim 20, wherein the analysis entity and the sending entity are located on a streaming server.

36. The analysis entity according to claim 20, wherein the analysis entity and the sending entity are located on a proxy server and the further sending entity is located on a streaming server.

37. The analysis entity according to claim 20, wherein the analysis entity is located at the receiving entity.

38. The analysis entity according to claim 20, wherein the transmission link comprises a wireless link of a mobile communication network.

* * * * *